United States Patent [19]

Kiisler et al.

[11] Patent Number: 4,615,737
[45] Date of Patent: Oct. 7, 1986

[54] IMPREGNATION COMPOSITION FOR THERMOCHEMICAL MODIFICATION OF WOOD AND PROCESS FOR PREPARING SAME

[75] Inventors: Karl R. Kiisler; Peep G. Kristianson; Tiya-Maya F. Sjuld; Tiit K. Kaps; Myart A. Riistop, all of Tallin; Juri K. Rokk, Pyarnu; Toomas O. Matvere, Pyarnu; Juri E. Pravon, Pyarnu; Ilmar M. Evert, Rapla, all of U.S.S.R.

[73] Assignee: Tallinsky Politekhnichesky Institut, Tallin, U.S.S.R.

[21] Appl. No.: 693,726

[22] Filed: Jan. 23, 1985

Related U.S. Application Data

[63] Continuation of Ser. No. 501,803, Jun. 7, 1983, abandoned.

[51] Int. Cl.$^4$ .............................................. C09G 1/04
[52] U.S. Cl. .................................. 106/12; 106/2; 524/841
[58] Field of Search .................. 106/2, 12, 287.2; 524/841; 156/335

[56] References Cited

U.S. PATENT DOCUMENTS

| | | | |
|---|---|---|---|
| 3,519,476 | 7/1970 | Bremmer et al. | 117/136 |
| 3,832,251 | 8/1974 | Aarna et al. | 156/60 |
| 3,968,276 | 7/1976 | Allen | 427/297 |
| 4,341,668 | 7/1982 | Martin et al. | 524/378 |

Primary Examiner—Amelia B. Yarbrough
Attorney, Agent, or Firm—Ladas & Perry

[57] ABSTRACT

An impregnation composition for a thermochemical modification of wood comprising a balanced aqueous-alcoholic solution and having the following chemical formulation, parts by mass:

| | |
|---|---|
| water-soluble oil-shale crude phenols | 100 |
| urea | 28–36 |
| formaldehyde | 35–40 |
| ammonia | 13–15 |
| ethylene glycol, its homolog or glycerol | 3–10 |
| ethanol | 5–1,750 |
| water | 100–3,370. |

A process for preparing an impregnation composition consists in that a mixture of 100 parts by mass of said water-soluble oil-shale crude phenols, 28–36 parts by mass of urea, 3–10 parts by mass of ethylene glycol, a homolog thereof or glycerol, 6–1,025 parts by mass of ethanol and 3–1,492 parts by mass of water is heated at a temperature of from 60° to 95° C. to give an aqueous-alcoholic solution A; a mixture of 95–107 parts by mass of 37% aqueous solution of formaldehyde, 54–62 parts by mass of a 24% aqueous solution of ammonia, 1–725 parts by mass of ethanol and 1–1,764 parts by mass of water is maintained at 20°–60° C. to give a solution B; solutions A and B are mixed in the mass ratio of 1:1.

7 Claims, No Drawings

IMPREGNATION COMPOSITION FOR THERMOCHEMICAL MODIFICATION OF WOOD AND PROCESS FOR PREPARING SAME

This is a continuation of Ser. No. 501,803 filed on June 7, 1983 abandoned.

FIELD OF THE INVENTION

The present invention relates to thermochemical modification of wood employed for the manufacture of edges and lower ply of skis, as well as other articles where improved physico-mechanical properties and weather-resistance of wood is required. More specifically, the present invention relates to an impregnation composition for thermochemical modification of wood and a process for preparing same.

BACKGROUND OF THE INVENTION

To impart water- and weather-resiatant properties to wood simultaneously with improvement of its physico-mechanical properties use is made of impregnation with synthetic resins including both monomers and oligomers, followed by polycondensation effected by the thermochemical method.

In the world practice for this purpose use is made of impregnation compositions based on phenol-formaldehyde resins. The basic formulations have been developed by Koppers Co., Diversified Wood Products Inc., Wayerhaeuser Co., Dow Chemical Co.

The principle of all these formulations resides in carrying out polycondensation of a monohydric phenol with formaldehyde for the preparation of oligomers curing with temperature or when exposed to heat in the presence of an additional amount of formaldehyde. For example, in U.S. Pat. No. 4,031,276 to Sumitomo Durez Co. for impregnation of wood use is made of a solution of a resol-type resin in a mixture of acetone and methanol. The company also has a number of processes based on the use of various starting compounds for the impregnation composition and different types of curing catalysts.

Wayerhaeuser Co. suggests, in U.S. Pat. No. 3,284,231. an impregnation composition containing methylolphenol, free formaldehyde and a weak organic acid.

In further developments, e.g. in U.S. Pat. No. 3,968,276 an additional use is made of products increasing fire-resistance of wood.

U.S. Pat. No. 3,159,503 to Koppers Co. teaches the use, as an impregnation composition, of a solution of a dicyanodiamide, orthophosphoric acid and free formaldehyde. Swedish Pat. No. 405,218 the same company suggests an impregnation composition based on monomethyloldicyanodiamide, melamine and orthophosphoric acid.

In U.S. Pat. No. 3,519,476 to Dow Chemical Co. use is made of an impregnation composition produced by interaction of an alkylphenol with an aliphatic or a cycloaliphatic amine in an acidic medium. After impregnation the wood is treated with ammonia at a temperature of from 85° to 150° C.

In the USSR there have been successfully employed impregnation compositions based on phenolic alcohols and a number of modifications thereof, e.g. a solution of phenyltrichlorosilane in acetone (cf. USSR Inventor's Certificate No. 390950), urea-formaldehyde resin (USSR Inventor's Certificate No. 575218), kerosene-gasoil fraction of oil (USSR Inventor's Certificate No. 763093), maleic anhydride (USSR Inventor's Certificate No. 620373).

Also known in the art is the use of an impregnation composition based on carbamidoformaldehyde resins with the addition of furan compounds and ammonium chloride for curing of the composition (cf. USSR Inventor's Certificate No. 414096).

According to USSR Inventor's Certificate No. 601162 use is made of an impregnation composition based on a mixture of caprolactam and higher fatty acids with the stage of keeping the wood in a solution of iron-ammonium alum and hydrogen peroxide prior to impregnation.

The life time of impregnation compositions based on polycondensation resins is extended in the presence of amino alcohols (cf. USSR Inventor's Certificate No. 656833).

A disadvantage of modification of wood by means of phenolic alcohols and phenol-formaldehyde oligomers resides in a non-uniform impregnation, corrugation and cracking of wood. Furthermore, the above-described impregnation compositions are instable, contain free formaldehyde and can be cured at a high temperature.

The prior art composition closest to that of the present invention as regards its subject matter and the result obtained is the impregnation composition according to U.S. Pat. No. 3,832,251 comprising monomeric resorcinols and a donor of formaldehyde-dimethylolurea in an aqueous solution of ethanol.

This impregnation composition is prepared by mixing monomeric resorcinols with an aqueous-ethanol solution of dimethylolurea.

The above-described impregnation composition according to U.S. Pat. No. 3,832,251 has, apart from the positive characteristics, certain disadvantages such as:

1. Due to the presence of free formaldehyde (up to 2%) in the impregnation composition and, hence, in the modified wood in the amount determined by equilibrium of the reaction of the formation and decomposition of dimethylolurea there are encountered sanitary-hygienic difficulties in the use of the composition and subsequent processing of ski blanks.
2. A low stability of the impregnation composition hinders elevation of the drying temperature above 50° C. and preparation of a composition with a content of dry solids above 30% (50% content of the dry solids is attained only upon the preparation of the composition in small amounts).
3. Due to a low stability of the aqueous-ethanolic solution of dimethylolurea, the latter is prepared directly in situ, i.e. at the site of application thereof, wherefore it is impossible to carry out centralized preparation of the impregnation composition.
4. Brittleness of the wood modified by means of this impregnation composition hinders its mechanical treatment in the manufacture of the ski edge and lower layer.

SUMMARY OF THE INVENTION

It is an object of the present invention to eliminate free formaldehyde from the impregnation composition.

It is also an object of the present invention to improve stability of the impregnation composition and, thereby, to elevate the final temperature of drying of blanks from the impregnated wood.

It is still another object of the present invention to increase the content of dry solids in the impregnation composition.

It is a further object of the present invention to improve elasticity of the modified wood and, thereby, improve conditions for a further machining of the wood.

It is also an object of the present invention to provide a process for the preparation of the impregnation composition possessing the above-specified properties.

These and other objects of the present invention are accomplished by an impregnation composition for a thermochemical modification of wood comprising an equilibrium water-alcohol solution of water-soluble oil-shale crude phenols with a content of hydroxy groups of 12.0–13.3 meq/g, urea, hexamethylenetetramine and molecular complexes of said phenols with urea and hexamethylenetetramine; as the alcoholic component the impregnation composition contains ethanol and a polyhydric alcohol selected from the group consisting of ethylene glycol, its homologs and glycerol; the impregnation composition has the following chemical formulation, parts by mass:

| water-soluble oil-shale crude phenols | 100 |
| urea | 28–36 |
| formaldehyde | 35–40 |
| ammonia | 13–15 |
| polyhydric alcohol | 3–10 |
| ethanol | 5–1,750 |
| water | 100–3,370. |

The impregnation composition according to the present invention has a content of dry solids within the range of from 3 to 60% by mass. This is an advantage of the composition and causes improvement of physico-chemical characteristics of modified wood. It is undesirable to use an impregnation composition with a content of dry solids of below 3% by mass, since the composition lacks its modifying effect. At a content of dry solids above 60% by mass the modification effect is not enhanced due to a sharp increase in viscosity.

Improvement of all characteristics of the impregnation composition (contains no free formaldehyde, has a high stability and a high content of dry solids) is attained mainly by that the impregnation composition is a system in the state of equilibrium containing molecular complexes of water-soluble oil-shale crude phenols with urea and hexamethylene tetramine in an aqueous-alcoholic solution according to the reaction of equilibrium:

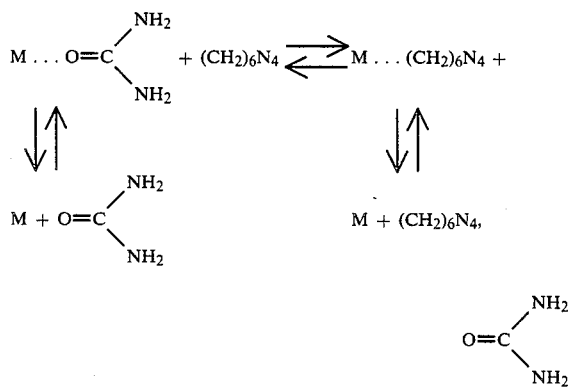

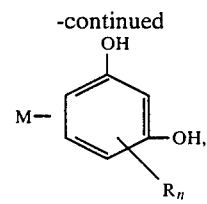

$R = -H, -CH_3, -C_2H_3, -C_2H_5, -C_3H_7, n = 1-3.$

It should be noted that the required activity under curing conditions is achieved through the use, as the phenol component, of highly-reactive shale water-soluble overall phenols with a content of hydroxy groups of 12.0 to 13.3 mequiv/g. By the term "water-soluble oil-shale crude phenols" we mean the product obtained upon thermal processing of the Estonian oil-shale.

During thermal processing of combustible shales a portion of phenols (2–2.5% by mass based on shale oil) is recover with tar water, while another portion is obtained by an additional washing of shale oil with water. These waters with a content of phenols of about 10 g/l is subjected to extraction with organic solvents to give, as a result, shale water-soluble overall phenols boiling at a temperature within the range of from 240° to 360° C. These phenols contain about 10% by mass of monohydric and 90% by mass of dihydric phenols. It has been found that dihydric phenols are alkylresorcinols.

The investigations carried out during recent years have made it possible to determine the chemical composition of water-soluble oil-shale crude phenols which is represented in the following Table 1.

TABLE 1

| Chemical composition | Content, % by mass |
|---|---|
| monohydric phenols | 8.6–10.4 |
| resorcinol | 1.6–2.3 |
| 2- and 4-methylresorcinols | 2.6–3.1 |
| 5-methylresorcinol | 28.0–30.3 |
| 2,4-dimethylresorcinol | 0.7–0.8 |
| 4,6-dimethylresorcinol | 1.1–1.5 |
| 2,5-dimethylresorcinol | 5.8–6.4 |
| 5-ethylresorcinol | 10.2–10.7 |
| 2-ethyl-5-methylresorcinol | 1.7–1.8 |
| 4,5-dimethylresorcinol | 5.7–7.5 |
| 5-ethenylresorcinol | 1.3–1.7 |
| 2-methyl-5-ethylresorcinol | 1.9–2.0 |
| 2,4,5-trimethylresorcinol | 2.1–3.0 |
| 5-propylresorcinol | 1.9–2.7 |
| 4-methyl-5-ethylresorcinol | 1.1–1.5 |
| other alkylresorcinols | 18.4–22.6 |
| including: | |
| four basic components | 50–55 |
| 5-substituted alkylresorcinols | 60–68 |
| content of hydroxy groups | 12.0–13.3 mequiv/g |

As it is seen from the above Table, the main components are 5-methyl-, 5-ethyl, 2,5-dimethyl- and 4,5-dimethylresorcinols with the total amount thereof ranging within narrow limits (50–55% by mass), 28–30% by mass of the above figure consituting 5-methylresorcinol.

A specific feature of the water-soluble oil-shale crude phenols is their higher reactivity as compared to resorcinol. This is explained by the presence of 5-sibstituted alkylresorcinols in the composition of the above-mentioned oil-shale crude phenols.

Elevation of the final temperature of drying of blanks from impregnated wood up to 90° C. is due to an increased stability of the impregnation composition according to the present invention.

An increased content of dry solids in the impregnation composition to 60% by mass is achieved due to the fact that the mixture of molecular complexes incorporated in the balanced solution retains homogeneity even at a small amount of a solvent, i.e. an aqueous alcoholic solution (mixture of ethanol with ethylene glycol, its homolog or glycerol in water).

An improved elasticity of modified wood is attained due to the fact that under the conditions of drying and compression of the impregnated wood there occurs the reaction of polycondensation of hexamethylene tetramine with the water-soluble oil-shale crude phenols and urea, thus resulting in evolution of ammonia which together with a high-boiling alcohol (ethylene glycol, a homolog thereof or glycerol) renders a plastifying effect on the wood.

Improved sanitary and hygienic conditions of labour in modification of wood is achieved due to the fact that the impregnation composition according to the present invention contains no free formaldehyde.

An increased content of dry solids in the impregnation composition, as well as increase of the final drying temperature of blanks from impregnated wood make it possible to increase productivity of modification and wood drying processes respectively.

The present invention also relates to a process for the preparation of an impregnation composition for a thermochemical modification of wood which resides in that a mixture consisting of water-soluble oil-shale crude phenols with a content of hydroxy groups of 12.0-13.3 meg/g, urea, a polyhydric alcohol-ethylene glycol, a homolog thereof or glycerol, ethanol and water is heated at a temperature within the range of from 60° to 95° C., the components being present in the following proportions, parts by mass:

| | |
|---|---|
| water-soluble oil-shale crude phenols | 100 |
| urea | 28-36 |
| ethylene glycol, its homolog or glycerol | 3-10 |
| ethanol | 6-1,025 |
| water | 3-1,492 | to give, as a result, an aqueous-alcoholic solution containing the above-mentioned water-soluble oil-shale crude phenols, urea and a molecular complex of these phenols with urea; also mixed are a 37% aqueous solution of formaldehyde, a 24% aqueous solution of ammonia, ethanol and water at the following proportions of the components, parts by mass:

| | |
|---|---|
| 37% aqueous solution of formaldehyde | 95-107 |
| 24% aqueous solution of ammonia | 54-62 |
| ethanol | 1-725 |
| water | 1-1,764 | and this mixture is maintained at a temperature within the range of from 20° to 60° C. to give an aqueous-alcoholic solution of hexamethylene tetramine; the resulting aqueous-alcoholic solution containing water-soluble oil-shale crude phenols, urea and a molecular complex of these phenols with urea is mixed with the above-mentioned aqueous-alcoholic solution of hexamethylene tetramine in the mass ratio of 1:1. As a result of intermixing of the two aqueous alcoholic solution there is formed an impregnation composition which comprises an aqueous-alcoholic solution in the state of equilibrium which contains water-soluble oil-shale crude phenols with a content of hydroxy groups of 12.0-13.3 meg/g, urea, hexamethylene tetramine and molecular complexes of said phenols with urea and hexamethylene tetramine.

In the preparation of the aqueous-alcoholic solution (referred to hereinafter as solution A) containing water-soluble oil-shale crude phenols, urea and a molecular complex of the above-mentioned phenols with urea, it is necessary to maintain temperature within the range of from 60° to 95° C. to ensure a joint solubility of the components (phenols and urea) in the solvent.

In the preparation of an aqueous-ethanol solution of hexamethylene tetramine (referred to hereinafter as solution B) it is necessary that temperature would not exceed 60° C. due to volatility of the starting components (formaldehyde and ammonia).

The mass ratio of the mixed two aqueous-ethanol solutions of 1:1 is selected with the view to ensure a simple procedure for the preparation of the impregnation composition. However, it is also possible to prepare the composition at other proportions causing complication of the process.

The aqueous-alcoholic solutions A and B have an unlimited storage period and preparation thereof can be organized on a centrallized basis. All this makes it possible to avoid the non-specific, for the wood-working industry, synthesis of dimethylolurea (donor of formaldehyde) and organize a centrallized preparation of the impregnation composition.

Detailed Description of the Invention

The impregnation composition for a thermochemical modification of wood is prepared by the mechanochemical method consisting in three steps:

1. An aqueous-alcoholic solution A is prepared in a reactor provided with a stirrer, thermometer, cooler and a cooling-heating jacket. Water-soluble oil-shale crude phenols are introduced into the reactor at a content of hydroxy groups of 12.0-13.3 meg/g and heated to the temperature of 40° C., added with urea and temperature is elevated to 60°-95° C., stirred till the formation of a molecular complex of water-soluble oil-shale crude phenols with urea and added with a polyhydric alcohol-ethylene glycol, a homolog thereof (diethylene glycol, triethylene glycol) or glycerol, water and ethanol. The solution is stirred, cooled and drained. It has an unlimited storage life and its preparation can be effected in a centralized manner.

2. An aqueous-alcoholic solution B is prepared in a similar reactor, whereinto there is introduced a 37% aqueous solution of formaldehyde. Under continuous stirring and cooling there is added a 25% aqueous solution of ammonia at such a rate that the mixture temperature would not exceed 60° C. The solution is cooled and drained. It has an unlimited storage life and can be prepared on a centralized basis.

3. The resulting aqueous-alcoholic solutions A and B are mixed in the mass ration of 1:1 at a temperature within the range of from 20° to 30° C. for 15 to 30 minutes till the state of equilibrium of molecular complexes is attained in the impregnation solution.

The storage period of the thus-produced impregnation composition is 20 days at a temperature of 20°-25° C., the composition contains no free formaldehyde.

The process for the preparation of the impregnation composition according to the present invention is further illustrated in Examples 1 to 5 given in Table 2 hereinbelow.

Table 3 shows various embodiments of the impregnation composition according to the present invention prepared according to Examples 1 to 5 of Table 2.

Table 4 shows comparative characteristics of the properties of the impregnation composition according to the present invention and the prior art impregnation composition according to U.S. Pat. No. 3,832,251.

| Starting components | Example 1 mass parts | Example 2 mass parts | Example 3 mass parts | Example 4 mass parts | Example 5 mass parts |
|---|---|---|---|---|---|
| Aqueous-alcoholic solution A | | | | | |
| Water-soluble oil-shale crude phenols | 100 | 100 | 100 | 100 | 100 |
| Urea | 36 | 28 | 32 | 30 | 32 |
| Ethylene glycol | — | — | 10 | 5 | — |
| Diethylene glycol | — | — | — | — | 10 |
| Triethylene glycol | — | 10 | — | — | — |
| Glycerol | 3 | — | — | — | — |
| Ethanol | 6 | 54 | 93 | 205 | 1025 |
| Water | 6 | 3 | 40 | 285 | 1492 |
| Aqueous-alcoholic solution B | | | | | |
| 37% aqueous solution of formaldehyde | 95 | 105 | 107 | 100 | 107 |
| 24% aqueous solution of ammonia | 54 | 60 | 62 | 58 | 62 |
| Ethanol | 1 | 26 | 66 | 125 | 725 |
| Water | 1 | 2 | 20 | 291 | 1764 |
| Impregnation composition | | | | | |
| Aqueous-alcoholic solution A | 100 | 100 | 100 | 100 | 100 |
| Aqueous-alcoholic solution B | 100 | 100 | 100 | 100 | 100 |

| Characteristics | Impregnation Composition of U.S. Pat. No. 3,832,251 | Impregnation composition of this invention |
|---|---|---|
| Content of free formaldehyde, % by mass | 1.5-2 | None |
| Content of dry solids, % by mass | 5-50 | 3-60 |
| Storage period of the impregnation composition at 20-25° C., days | 10-12 | 18-20 |
| Temperature of drying of blanks from impregnated wood, °C. | 20-50 | 20-90 |
| Stability in storage | Components of the impregnation composition are prepared directly at the site of usage | Aqueous-alcoholic solutions A and B have substantially unlimited period of storage; preparation of the impregnation composition is effected on a centralized basis |

Thermochemical modification of wood with the use of the impregnation composition of this invention comprises impregnation of wood in an open bath or in an autoclave under pressure with preliminary evacuation. Then the impregnated wood is subjected to drying at a temperature of 20°-90° C. ensuring preliminary polycondensation of the employed composition. The process of polycondensation is carried out at 100°-180° C., preferably at 100°-120° C. under pressure of 0.2-6.0 MPa.

Comparative physico-mechanical characteristics of the modified wood produced with the use of the impregnation compositions according to the present invention and known composition according to U.S. Pat. No. 3,832,251 are shown in Table 5 hereinbelow.

It is seen from Table 5 that at an equal content of dry solids in impregnation compositions, physico-mechanical characteristics of the wood modified with the use of the impregnation composition according to the present invention are by 1.1-1.7 times higher than those of the wood modified with the impregnation composition according to U.S. Pat. No. 3,832,251.

| Chemical composition | Example 1 (content of dry solids 60% by mass), parts by mass | Example 2 (Content of dry solids 45% by mass), parts by mass | Example 3 (Content of dry solids 30% by mass), parts by mass | Example 4 (Content of dry solids 15% by mass), parts by mass | Example 5 (Content of dry solids 3% by mass) parts by mass |
|---|---|---|---|---|---|
| Water soluble oil-shale crude phenols | 100 | 100 | 100 | 100 | 100 |
| Urea | 36 | 28 | 32 | 30 | 32 |
| Formaldehyde | 35 | 39 | 40 | 37 | 40 |
| Ammonia | 13 | 14.5 | 15 | 14 | 15 |
| Ethylene glycol | — | — | 10 | 5 | — |
| Diethylene glycol | — | — | — | — | 10 |
| Triethylene glycol | — | 10 | — | — | — |
| Glycerol | 3 | — | — | — | — |
| Ethanol | 5 | 80 | 160 | 380 | 1750 |
| Water | 100 | 126 | 174 | 683 | 3370 |

TABLE 5

| Physico-mechanical characteristics of modified wood | Impregnation composition of U.S. Pat. No. 3,832,251 | Impregnation composition of the present invention | | | |
|---|---|---|---|---|---|
| | Content of dry solids, percent by mass | | | | |
| | 30 | 60 Example 1 | 45 Example 2 | 30 Example 3 | 3 Example 5 |
| Compression along fibres, MPa | 133.5 | 171.5 | 167.0 | 145.8 | 122.5 |
| Static bending, MPa | 120.0 | 206.6 | 217.4 | 170.0 | 115.0 |
| Shearing stress of the adhesive joint, MPa | 11.0 | 19.7 | 15.7 | 13.5 | 9.8 |
| Impact bending, J/cm$^3$ | 4.5 | 4.5 | 5.0 | 5.0 | 4.8 |
| Dimensional stability, % | 7.5 | 3.0 | 3.3 | 4.5 | 9.0 |
| Density, g/cm$^3$ | 0.75 | 0.96 | 0.86 | 0.78 | 0.68 |

What is claimed is:

1. An impregnation composition for a thermochemical modification of wood comprising a balanced aqueous-alcoholic solution of water-soluble oil-shale crude phenols with a content of hydroxy groups of from 12.0 to 13.3 meq/g, urea, hexamethylene tetramine and molecular complexes of said phenols with urea and hexamethylene tetramine; as the alcoholic component the impregnation composition contains ethanol and a polyhydric alcohol selected from the group consisting of ethylene glycol, homologs thereof and glycerol; the impregnation composition having the following formulation, parts by mass:

| water-soluble oil-shale crude phenols | 100 |
|---|---|
| urea | 28–36 |
| formaldehyde | 35–40 |
| ammonia | 13–15 |
| polyhydric alcohol | 3–10 |
| ethanol | 5–1,750 |
| water | 100–3,370. |

2. An impregnation composition for a thermochemical modification of wood comprising a balanced aqueous-alcoholic solution of water-soluble oil-shale alkylresorcinols with a content of hydroxy groups of from 12.0 to 13.3 meq/g, urea, hexamethylene tetramine and molecular complexes of said alkylresorcinols with urea and hexamethylene tetramine; as the alcoholic component the impregnation composition contains ethanol and a polyhydric alcohol selected from the group consisting of ethylene glycol, homologs thereof and glycerol; the impregnation composition having the following formulation, parts by mass:

| water-soluble oil-shale alkylresorcinols | 100 |
|---|---|
| urea | 28–36 |
| formaldehyde | 35–40 |
| ammonia | 13–15 |
| polyhydric alcohol | 3–10 |
| ethanol | 5–1,750 |
| water | 100–3,370. |

3. A process for preparing an impregnation composition for thermochemical modification of wood comprising heating a mixture consisting of water-soluble oil-shale alkylresorcinols with a content of hydroxy group of 12.0–13-3 meq/g urea, a polyhydric alcohol, ethanol and water at a temperature of from 60° to 95° C., the components being present in the following proportions, parts by mass:

| water-soluble oil-shale alkylresorcinols | 100 |
|---|---|
| urea | 28–36 |
| polyhydric alcohol | 3–10 |
| ethanol | 6–1,025 |
| water | 3–1,492; | as said polhydric alcohol use is made of an alcohol selected from the group consisting of ethylene glycol, homologs thereof and glycerol; as a result an aqueous-alcoholic solution is obtained containing said water-soluble oil-shale alkylresorcinols, urea and a molecular complex of said alkylresorcinols with urea; also mixed are a 37% aqueous solution of formaldehyde, a 24% aqueous solution of ammonia, ethanol and water at the following proportions of the components, part by mass:

| 37% aqueous solution of formaldehyde | 95–107 |
|---|---|
| 24% aqueous solution of ammonia | 54–62 |
| ethanol | 1–725 |
| water | 1–1,764 | and said mixture is maintained at a temperature of 20° to 60° C.; as a result an aqueous-alcoholic solution of hexamethylene tetramine is obtained; the resulting aqueous-alcoholic solution containing water-soluble oil-shale alkylresorcinols, urea and a molecular complex of said alkylresorcinols with urea is mixed with said aqueous-alcoholic solution of hexamethylene tetramine.

4. An impregnation composition as in claim 2 wherein said composition is free of free-formaldehyde.

5. An impregnation composition as in claim 2 wherein the majority of said alkylresorcinols comprises one of the group of alkylresorcinols consisting of
5-methylresorcinol, 5-ethylresorcinol, 2,5 dimethylresorcinol and 4,5 dimethylresorcinol or mixtures thereof.

6. A method for thermochemically modifying wood comprising:
(a) applying a composition of a balanced aqueous-alcoholic solution of water-soluble oil-shale alkylresorcinols with a content of hydroxy groups of from 12.0 to 13.3 meq/g, urea, hexamethylene tetramine and molecular complexes of said alkylresorcinols with urea and hexamethylene tetramine; as the alcoholic component the impregnation composition contains ethanol and a polyhydric alcohol selected from the group consisting of ethylene glycol, homologs thereof and glycerol; the impregnation composition having the following formulation, parts by mass:

| | |
|---|---|
| water-soluble oil-shale alkyresorcinols | 100 |
| urea | 28–36 |
| formaldehyde | 35–40 |
| ammonia | 13–15 |
| polyhydric alcohol | 3–10 |
| ethanol | 5–1,750 |
| water | 100–3,370 | to wood in an open bath or autoclave under pressure;
(b) drying the impregnated wood at a temperature of 20°–90° C.;
(c) polycondensing the wood at a temperature of 100°–120° C.

7. A process as in claim 4 wherein the mass ratio of said aqueous-alcoholic solution of the mixture of water-soluble alkyl resorcinols and urea to the aqueous-ethanol solution of hexamethylene tetramine is 1:1.

* * * * *